US008352357B2

(12) United States Patent
Rotman et al.

(10) Patent No.: US 8,352,357 B2
(45) Date of Patent: Jan. 8, 2013

(54) METHOD AND SYSTEM FOR IMPROVED ONLINE AUCTION

(75) Inventors: Greg Rotman, Canton, MA (US); Richard Rotman, Westborough, MA (US); John Martin, Cherry Valley, MA (US)

(73) Assignee: Paid, Inc., Worcester, MA (US)

( * ) Notice: Subject to any disclaimer, the term of this patent is extended or adjusted under 35 U.S.C. 154(b) by 0 days.

(21) Appl. No.: 13/563,051

(22) Filed: Jul. 31, 2012

(65) Prior Publication Data

US 2012/0316980 A1 Dec. 13, 2012

Related U.S. Application Data

(60) Continuation of application No. 13/088,246, filed on Apr. 15, 2011, now abandoned, which is a division of application No. 11/755,659, filed on May 30, 2007, now Pat. No. 7,930,237, which is a continuation of application No. 10/106,476, filed on Mar. 25, 2002, now Pat. No. 7,324,968.

(51) Int. Cl.
*G06Q 40/00* (2006.01)

(52) U.S. Cl. ............ 705/37; 705/35; 705/26.3; 705/335

(58) Field of Classification Search ................... 705/37, 705/35, 26.3, 335
See application file for complete search history.

(56) References Cited

U.S. PATENT DOCUMENTS

| | | | |
|---|---|---|---|
| 4,462,473 A | 7/1984 | Valestin | |
| 4,495,581 A | 1/1985 | Piccione | |
| 4,799,156 A | 1/1989 | Shavit et al. | |
| 4,992,940 A | 2/1991 | Dworkin | |
| 5,024,282 A | 6/1991 | Raikes et al. | |
| 5,602,742 A | 2/1997 | Solondz et al. | |
| 5,615,120 A | 3/1997 | Schwartz et al. | |
| 5,675,493 A | 10/1997 | Schwartz et al. | |
| 5,699,258 A | 12/1997 | Thiel | |
| 5,717,989 A | 2/1998 | Tozzoli et al. | |
| 5,841,076 A | 11/1998 | Schwartz et al. | |
| 5,905,232 A | 5/1999 | Schwartz et al. | |
| 5,960,411 A | 9/1999 | Hartman et al. | |
| 5,995,950 A | 11/1999 | Barns-Slavin et al. | |
| 6,013,878 A | 1/2000 | Schwartz et al. | |
| 6,029,141 A | 2/2000 | Bezos et al. | |
| 6,029,146 A | 2/2000 | Hawkins et al. | |
| 6,047,273 A | 4/2000 | Vaghi | |
| 6,058,373 A | 5/2000 | Blinn et al. | |
| 6,064,981 A | 5/2000 | Barni et al. | |
| 6,085,170 A | 7/2000 | Tsukuda | |
| 6,153,835 A | 11/2000 | Schwartz et al. | |
| 6,233,568 B1 | 5/2001 | Kara | |
| 6,598,027 B1 | 7/2003 | Breen, Jr. et al. | |
| 6,606,607 B1 | 8/2003 | Martin et al. | |
| 6,615,226 B1 | 9/2003 | Hartman et al. | |
| 6,704,716 B1 | 3/2004 | Force | |

(Continued)

FOREIGN PATENT DOCUMENTS

CA 2313283 12/2001

(Continued)

*Primary Examiner* — Lindsay M. Maguire
(74) *Attorney, Agent, or Firm* — Hunton & Williams LLP

(57) ABSTRACT

Methods and systems for improving auction-based online commerce are provided, including methods and systems for facilitating advance, rapid, accurate estimation of shipping costs between a seller and the winner of an online auction. Methods and systems include an application for facilitating seller estimation of shipping costs, including various components of shipping costs, and for providing to the buyer a shipping estimate based on the circumstances of the buyer and the auction.

24 Claims, 21 Drawing Sheets

U.S. PATENT DOCUMENTS

| | | |
|---|---|---|
| 7,324,968 B2 | 1/2008 | Rotman et al. |
| 7,930,237 B1 | 4/2011 | Rotman et al. |
| 2001/0000044 A1 | 3/2001 | Lin |
| 2001/0027431 A1 | 10/2001 | Rupp et al. |
| 2001/0032147 A1 | 10/2001 | Siegel |
| 2001/0049636 A1 | 12/2001 | Hudda et al. |
| 2002/0002509 A1 | 1/2002 | Wagorn et al. |
| 2002/0013739 A1 | 1/2002 | O'Donnell et al. |
| 2002/0029184 A1 | 3/2002 | Reiner |
| 2002/0032573 A1 | 3/2002 | Williams et al. |
| 2002/0032612 A1 | 3/2002 | Williams et al. |
| 2002/0032641 A1 | 3/2002 | Mendiola et al. |
| 2002/0107777 A1 | 8/2002 | Lane et al. |
| 2002/0107807 A1 | 8/2002 | Ketonen et al. |
| 2002/0116305 A1 | 8/2002 | Abhyanker |
| 2002/0116318 A1 | 8/2002 | Thomas et al. |
| 2002/0198814 A1 | 12/2002 | Bansal et al. |
| 2003/0105709 A1 | 6/2003 | Orlando |
| 2003/0144922 A1 | 7/2003 | Schrantz et al. |
| 2003/0154134 A1 | 8/2003 | Wang |
| 2005/0038758 A1 | 2/2005 | Hilbush et al. |

FOREIGN PATENT DOCUMENTS

| | | |
|---|---|---|
| EP | 0 991 024 | 4/2002 |
| JP | 2002-024353 | 1/2002 |
| JP | 2003-058773 | 2/2003 |
| WO | WO 00/70519 | 11/2000 |
| WO | WO 01/20524 | 3/2001 |
| WO | WO 02/31737 | 4/2002 |

FIG. 4

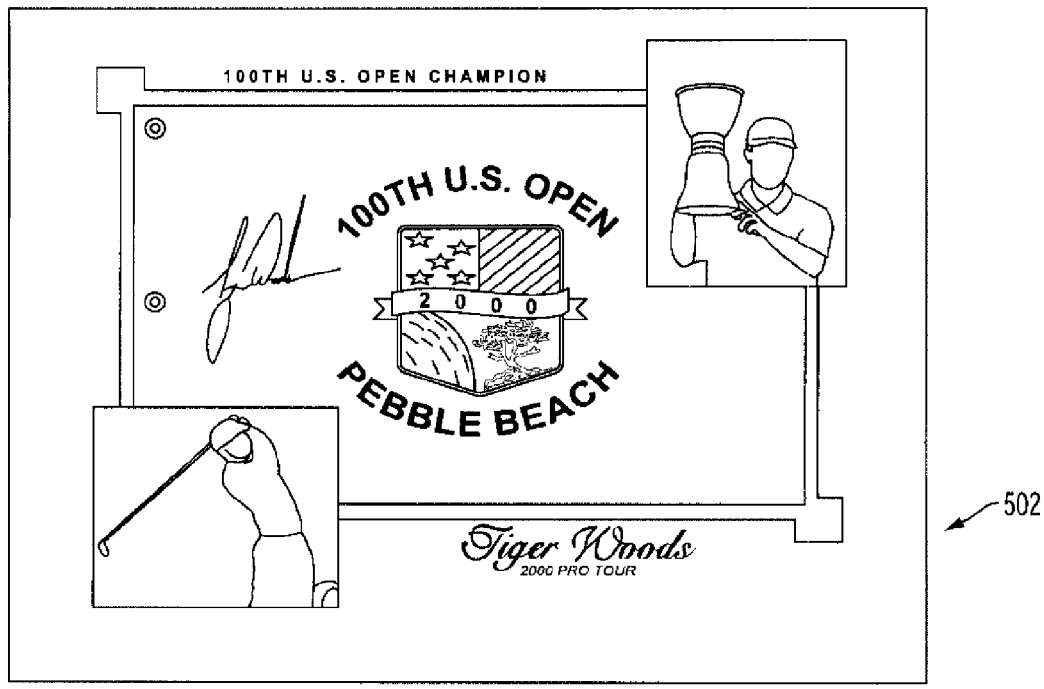
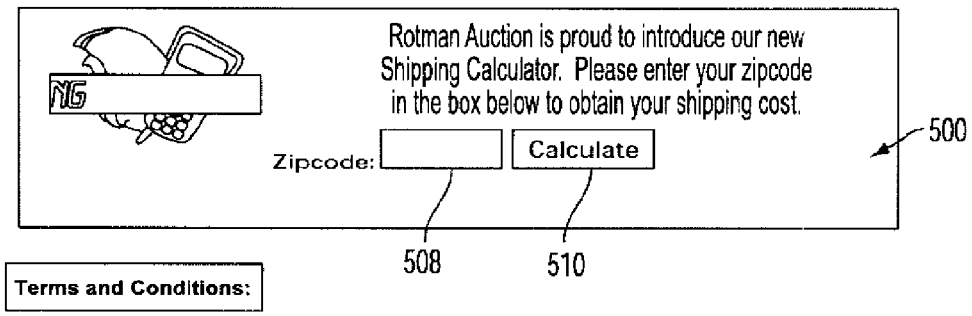
Please click here to see our other auctions.
FIG. 5

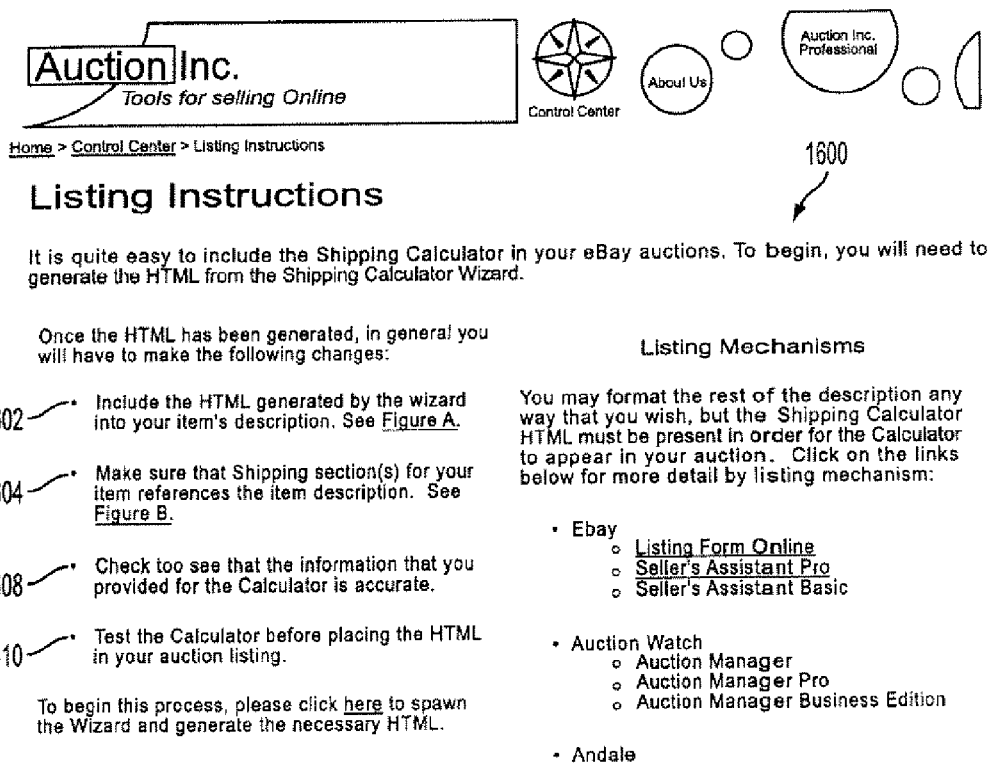

Listing Instructions

It is quite easy to include the Shipping Calculator in your eBay auctions. To begin, you will need to generate the HTML from the Shipping Calculator Wizard.

Once the HTML has been generated, in general you will have to make the following changes:

1602 — • Include the HTML generated by the wizard into your item's description. See Figure A.

1604 — • Make sure that Shipping section(s) for your item references the item description. See Figure B.

1608 — • Check too see that the information that you provided for the Calculator is accurate.

1610 — • Test the Calculator before placing the HTML in your auction listing.

To begin this process, please click here to spawn the Wizard and generate the necessary HTML.

Listing Mechanisms

You may format the rest of the description any way that you wish, but the Shipping Calculator HTML must be present in order for the Calculator to appear in your auction. Click on the links below for more detail by listing mechanism:

- Ebay
  - Listing Form Online
  - Seller's Assistant Pro
  - Seller's Assistant Basic

- Auction Watch
  - Auction Manager
  - Auction Manager Pro
  - Auction Manager Business Edition

- Andale

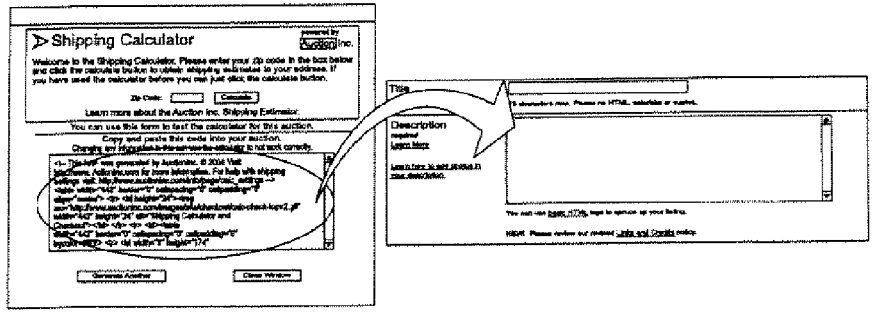

FIG. 16

HTML Wizard

Please fill in the appropriate information for your new auction listing and hit "Generate HTML" to receive the sample code to insert into your auction listing.

Select how you want the Shipping Calculator form to be displayed on your auction: —1702
[Default ▽]

Flat Shipping:

Charge flat shipping rate: ☐—1710

Shipping for first item: $[0.00]—1704

For each additional item: $[0.00]—1708

═══════════════════ OR ═══════════════════

Calculate Shipping:

How to package this item if the buyer wins more than 1 of your auctions: [Together ▽]—1708

Item weight (exclude packaging material weight unless packaging separately): [2] lbs [0] oz —1714

Enter the dimensions of this item or package if this item is being packaged separately:
Length: [ ] in. —1718
Width: [ ] in. —1720
Height: [ ] in. —1722

Additonal Options:

Item is taxable: ☑—1724

Include insurance with shipping. ☑—1728

[Generate HTML]—1730      [Close Window]

FIG. 17

Auction Inc.
*Tools for selling Online*

Home > Control Center > Shipping Configuration > Carriers

Configure Ship Methods

| USPS | Activate ~1802 | Handling Charge ~1804 | | Max weight |
|---|---|---|---|---|
| Priority Mail | ☑ | 14.29 | percent ▽ | 70 |
| Parcel Post | ☑ | 10.00 | percent ▽ | 70 |
| UPS | Activate | Handling Charge | | Max weight |
| Ground | ☑ | 15.00 | percent ▽ | 70 |
| 2nd Day Air | ☑ | 15.00 | percent ▽ | 70 |
| Next Day Air | ☐ | 15.00 | percent ▽ | 70 |
| 3 Day Select | ☑ | 15.00 | percent ▽ | 70 |

1800

[ CANCEL ]

Home | About Us | Pricing | Testimonials | Learn More | Partners | Contact Us | User Agreement | Privacy Policy Copyright © 2002 Auction Inc.
A division of Sales OnLine Direct, Inc.

Packaging Configuration

Packaging weight is calculated by using a sliding scale factor to account for the overall weight. Typically as the physical weight increases, the factor will decrease.

Carrier: Default
Service: Default

2000

| Weight <= | Factor (%) |
|---|---|
| 1.0000 | 25 |
| 5.0000 | 15 |
| 20.0000 | 10 |
| 50.0000 | 5 |
| 70.0000 | 2.5 |
| 0.0000 | 0 |
|  |  |
|  |  |
|  |  |
|  |  |

[UPDATE] [CANCEL]

Home | About Us | Pricing | Testimonials | Learn More | Partners | Contact Us | User Agreement | Privacy Policy Copyright © 2002 Auction Inc.
A division of Sales OnLine Direct, Inc.

FIG. 20

Auction Inc.
Tools for selling Online

Home > Control Center > Shipping Configuration > Sales Tax

Sales Tax

2100

| | Country | State | Last Modified | Tax Rate |
|---|---------|-------|---------------|----------|
| ● | USA | ID | 19-Mar-2002 19:09 | 0.0400 |
| ○ | USA | MD | 19-Mar-2002 03:03 | 0.0505 |
| ○ | USA | MA | 08-Jan-2002 13:07 | 0.0500 |

[Edit] [Remove]   [Add] [CANCEL]

Home | About Us | Pricing | Testimonials | Learn More | Partners | Contact Us | User Agreement | Privacy Policy Copyright © 2002 Auction Inc.
A division of Sales OnLine Direct, Inc.

FIG. 21

METHOD AND SYSTEM FOR IMPROVED ONLINE AUCTION

CROSS-REFERENCE TO RELATED APPLICATIONS

This patent application is a continuation of U.S. patent application Ser. No. 13/088,246, filed Apr. 15, 2011, which is a divisional of U.S. patent application Ser. No. 11/755,659, filed May 30, 2007, now U.S. Pat. No. 7,930,237, issued Apr. 19, 2011, which claims priority to U.S. patent application Ser. No. 10/106,476, filed Mar. 25, 2002, now U.S. Pat. No. 7,524,968, issued Jan. 29, 2008, each of which is hereby incorporated by reference herein in its entirety.

FIELD OF THE DISCLOSURE

This disclosure relates to the field of electronic commerce, and more particularly to the field of online auctions.

BACKGROUND OF THE DISCLOSURE

Online auctions have become a fixture of electronic commerce. Auctions offer buyers the possibility of finding specialized goods and services, antiques, used items, and other items that can be difficult to find in conventional stores or in other electronic commerce storefronts. Because prices are not fixed, buyers can also obtain some items at significant discounts to retail list prices.

Auctions offer sellers the benefit of price competition among buyers, creating markets for goods and services for which it is normally difficult to set prices.

However, participants in auctions face certain difficulties. One of these difficulties is the difficulty of determining the actual cost of the item to the buyer, because the actual cost includes not only the winning bid but also any shipping, handling, or other costs that are to be added to the bid. Uncertainty as to shipping prices has led many buyers to complain, which in turn has resulted in pressure on sellers to offer various promotions, such as free shipping, flat rate shipping, and the like. The problem with such promotions is that they can be very costly to the seller, such as in cases where shipping distances are higher than expected, so that the cost of shipping an item greatly exceeds a flat rate estimate. Since most auctions do not communicate the address of the buyer until the end of the auction, unexpected shipping costs are a persistent problem for sellers and buyers alike. Thus, a need exists for the parties to online auctions to have access to better information in advance about the real shipping costs for their items.

SUMMARY OF THE DISCLOSURE

Provided herein are methods and systems for facilitating auction-based online commerce. Such methods and systems may include a rate engine for determining the cost of shipping an item from a location designated by a seller to a location designated by a buyer, the rate engine comprising an insurance rate calculator, a carrier rate calculator, and a packaging calculator. Such methods and systems may further include a retrieval application for retrieving auction data via a communication network and a calculation module for automatically determining a shipping cost for the item upon conclusion of the auction, based on data from the rate engine and the retrieval application.

It should be noted that the term "auction" is used herein to describe a situation where a seller offers goods online via a bidding process; however, it should be understood that where context permits it should be understood to further encompass other methods by which a seller offers goods or services, such as a reverse auction, or a direct online product offering. Thus, a seller could build a shipping calculator into a product offering through an online store, allowing a buyer, for example, to estimate shipping costs for a combined order based on the weights of the various items. Thus, the term auction should not be understood to be limiting except where context requires it.

BRIEF DESCRIPTION OF THE DRAWINGS

A more detailed description of the disclosure summarized above will be provided by reference to certain specific preferred embodiments described below and illustrated in the following figures.

FIG. 4 is a screen display from a conventional online auction.

FIG. 5 is a screen display for a shipping rate calculator inserted into an online auction listing.

FIG. 16 is a screen display with listing steps for a seller to offer a shipping calculator in an online auction.

FIG. 17 is a screen display for a wizard program for facilitating the offering of a shipping calculator in an online auction.

FIG. 18 is a screen display for an online form that allows a seller to configure preferences for shipping methods.

FIG. 19 is a screen display showing a seller's shipping configuration preferences for an online auction.

FIG. 20 is a screen display for an online form for allowing a seller to configure packaging weights for supporting shipping calculations.

FIG. 21 is a screen display for an online form for allowing a seller to indicate whether sales are taxable and for indicating the tax rate that will apply.

DETAILED DESCRIPTION OF EXEMPLARY EMBODIMENTS

Figure 1:
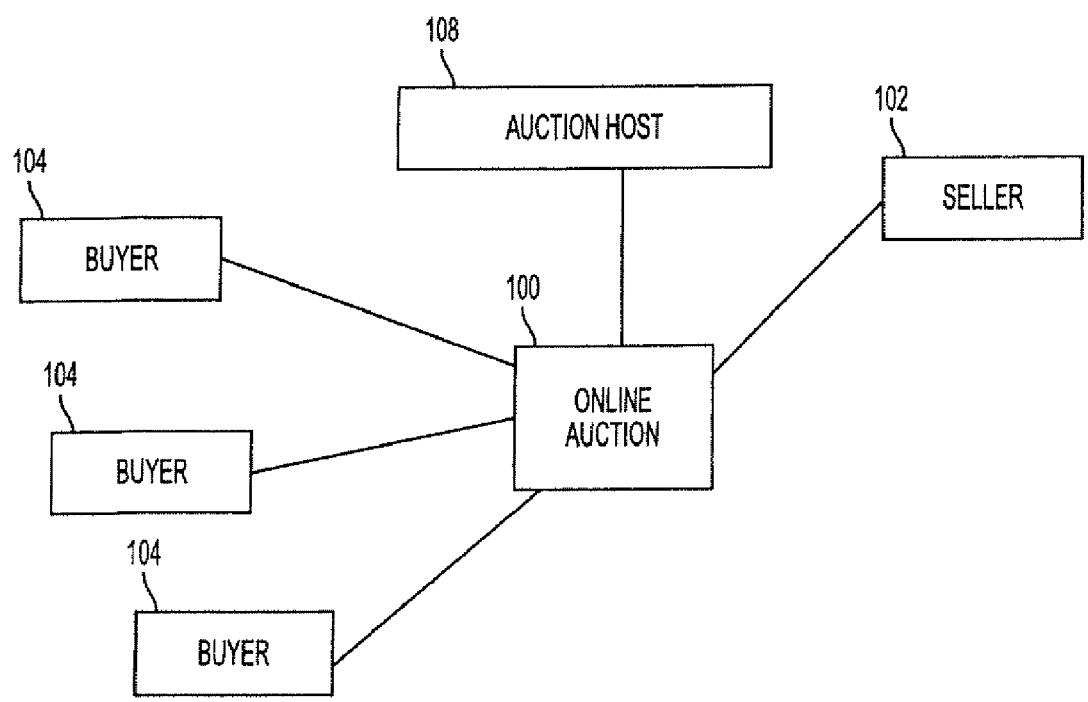
FIG. 1 is a schematic diagram showing entities that interact for an auction marketplace.

Referring to FIG. 1, a schematic diagram is provided depicting entities that participate in an online auction 100. A seller 102 presents items to be sold in the online auction 100, which may be hosted by an auction host 108. One or more buyers 104 bid on the items according to the rules of the auction host 108, typically resulting in the highest bid winning the auction at the close of a predetermined time period. Online auctions are well known, including those where the auction host 108 is eBay, Yahoo.com, Ubid.com, Amazon.com, or many others.

Figure 2:
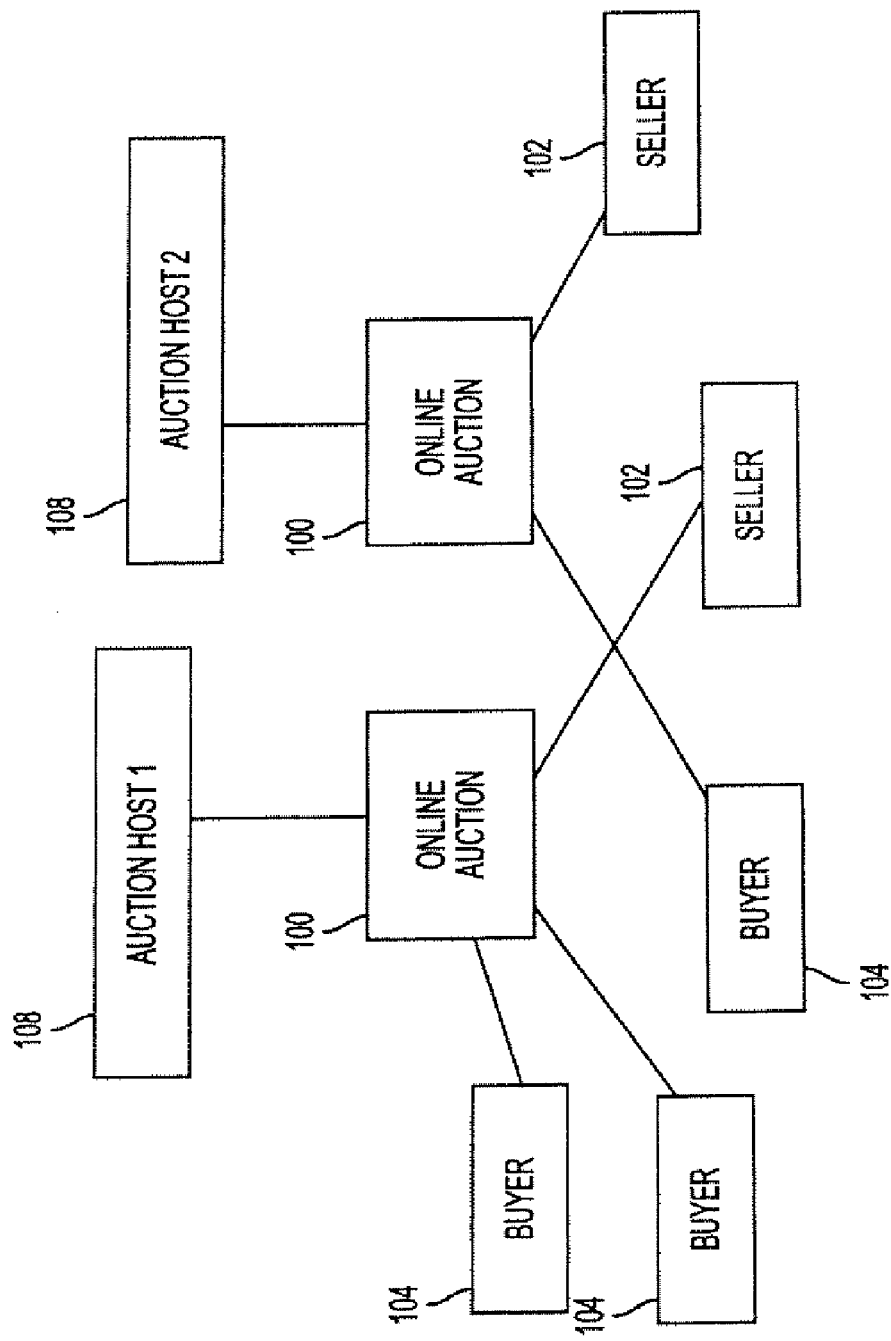
FIG. 2 is a schematic diagram showing entity interactions for a marketplace wherein multiple sellers, buyers, and auction hosts interact through multiple auctions.

Referring to FIG. 2, in a typical marketplace, there are multiple online auctions 100, hosted by multiple auction hosts 108, with multiple sellers 102 and multiple buyers 104. Thus, a given buyer 104 typically participates in more than one auction, perhaps involving more than one seller 102. Similarly, a given seller 102 may wish to sell more than one item in more than one auction 100. Certain auction hosts 108 are known for hosting generalized auctions of almost any kind of goods and services. In other cases auction hosts 108 specialize in particular goods or services, such as sports memorabilia. Thus, a given seller 102 may use different auction hosts 108 for different auctions, depending on the needs of a particular auction.

Figure 3:
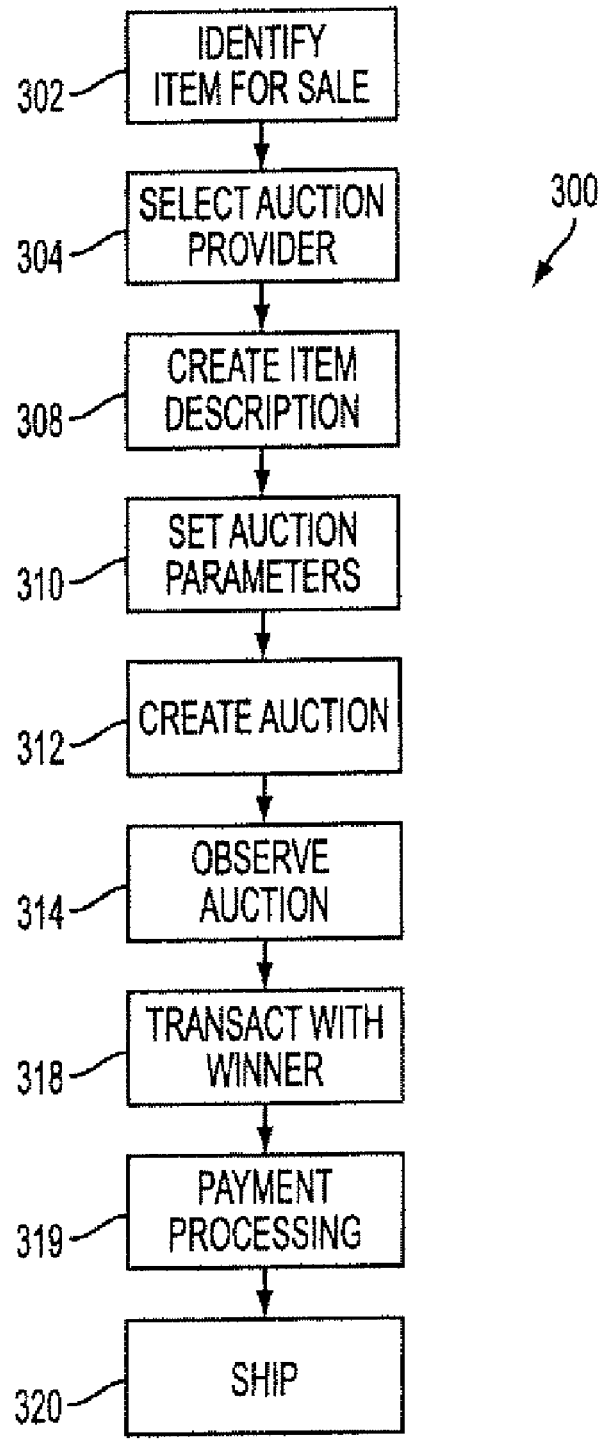
FIG. 3 is a flow diagram showing certain process steps accomplished in a conventional online auction.

Referring to FIG. 3, a flow diagram 300 depicts steps by which a typical online auction takes place. First, at a step 302 a seller 102 identifies an item that the seller wishes to auction. Next, at a step 304 the seller selects an auction provider, such as eBay. Next, at a step 308, the seller creates a description of the item to be auctioned, typically a combination of words and pictures that depict the details of the item. At a step 310 the seller sets various auction parameters, such as the dates of the auction, the minimum price the seller will accept for the goods, as well as other factors such as whether the seller is willing to pay shipping costs, to ship outside a given region, and the like. These parameters are typically entered via a conventional computer data entry mechanism, such as a web-based form, such as one created in HTML or a similar markup language like dynamic HTML or the like. The form contains the relevant data fields for setting auction parameters and when submitted by the seller to the auction host 108 through an online submission mechanism, the servers of the auction host recognize the form and facilitate creation of the auction at a step 312. Such steps are conventional in online auctions and are typically created by CGI scripts or similar coding mechanisms for recognizing HTTP messages and executing appropriate actions.

Once the seller has created the auction at the step 312, the auction can be found online at a site hosted by the host 108. At a step 314 the seller 102 can observe the auction until it terminates, either with one or more winning buyers 104 who have at least met the seller's minimum price for the item, or with no winner. Once one or more winners have been determined, at a step 318 the seller 102 interacts with the winning buyer 104 to complete the transaction. This interaction conventionally requires a communication between seller 102 and buyer 104, such as an exchange of emails, a telephone call, or the like. The transaction step 318 may include various sub-steps, such as the seller communicating shipping options to the buyer 104, the buyer 104 sending address information to the seller 102, and the buyer making payment to the seller 102. At a step 319 the buyer pays for the item. To complete the transaction, the seller 320 ships the item to the buyer 104 (or directs shipment to the buyer 104 from a third party) at a step 320. The shipping step 320 may involve an additional charge for the buyer 104 or for the seller 102, or for both.

Figure 4:
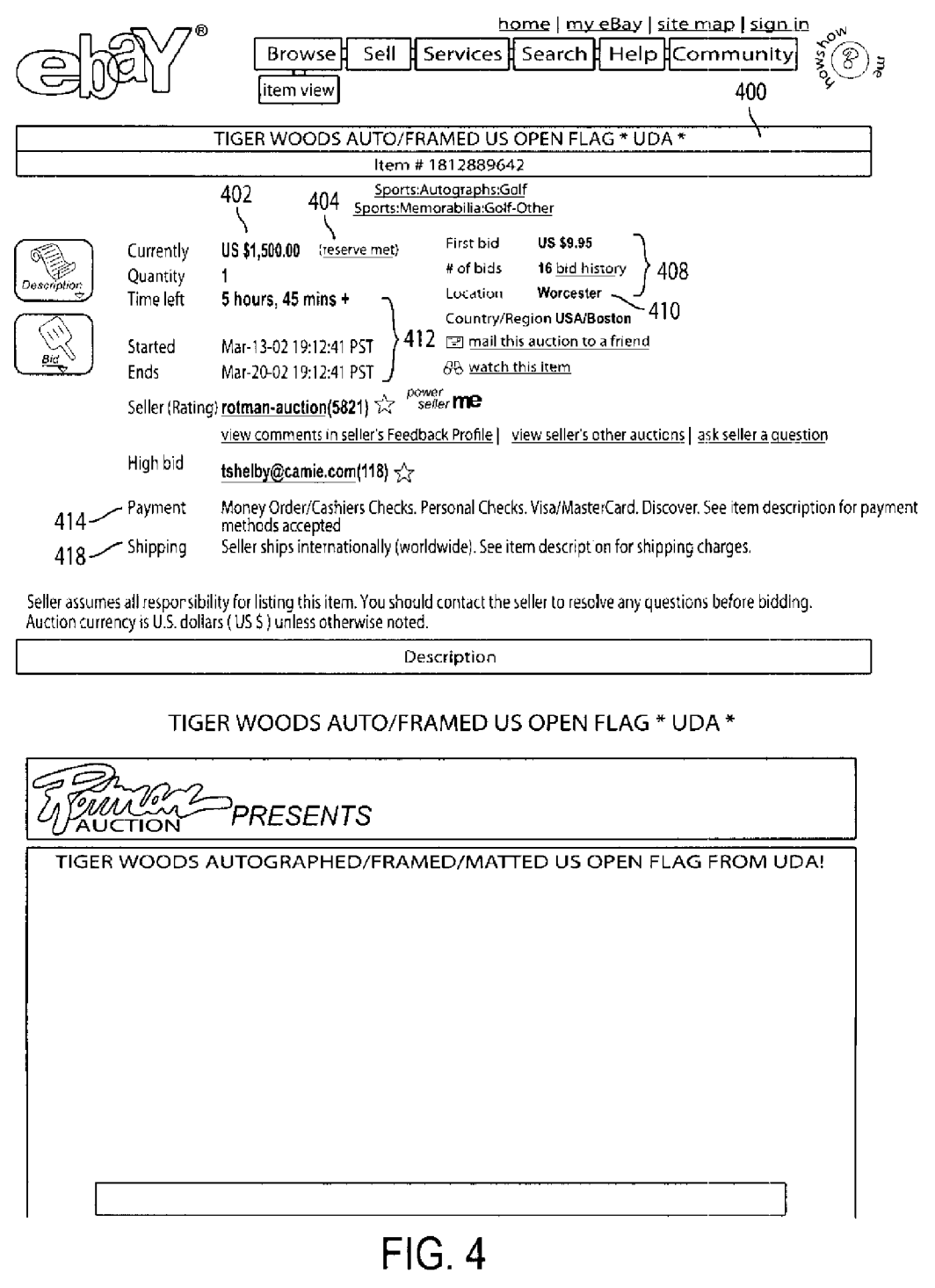

FIG. 4 depicts an example of a screen display for an online auction 100, in this case a sports memorabilia item 400. The auction shows the current bid 402, whether the reserve bid has been met 404, items about bidding history 408, the location of the seller 410, and date and time information 412 for the auction 100. The description may also include information about payment options 414 and shipping options 418.

The conventional online auctions described in conjunction with FIGS. 1-4 do not offer the buyer 104 complete information about the real cost of the auction, because they do not specify exact shipping cost information. Referring to FIG. 5, an improved auction method and system includes a shipping calculator 500. The shipping calculator 500 can be included in the display 502 for the auction item itself. The shipping calculator 500 can prompt a potential buyer 104 to enter information necessary to determine shipping cost. In an embodiment, that information may include entry of a zip code of the buyer 104 in a zip code field 508 of the display 502. When the buyer 104 enters the zip code information in the zip code field 508 the buyer 104 may then initiate the shipping calculator 500 by clicking a display button, such as a calculate button 510. As used herein, the term "zip code" should be understood to include other location information, such as origin codes in other countries, international postal codes, addresses, country codes, or the like.

Figure 6:
FIG. 6 is a screen display for a more detailed shipping rate calculator for an online auction.

Referring to FIG. 6, triggering the calculate button 510 of FIG. 5 sends a message (such as an HTTP message) to a server, which can in turn present a more detailed shipping calculator 600 to the buyer 104 as an HTML form. In addition to the zip code or other location code in that field, the shipping calculator 600 now includes an item identification field 604, in which the buyer 104 may enter an auction number or similar identifier for the item that the buyer 104 is considering for bid, and an anticipated winning bid field 602, in which the buyer 104 enters the expected amount the buyer 104 expects to have to pay in order to win the auction 100. The buyer 104 can then hit a second calculate button 610 to initiate further calculation. As with other web-based services, hitting the calculate button 610 submits an HTML form with the relevant data for further action by a server, such as an HTTP server. The actions of a system for facilitating the shipping calculator are described further below. As further described below, it should be noted that the shipping calculator 500 could be embodied in various forms using various software models and business models. For example, the calculator could be provided as a client program to be downloaded onto the user's machine, as a application service provider (ASP) application accessed by a computer network from the user's machine, or a combination of the same.

Figure 7:
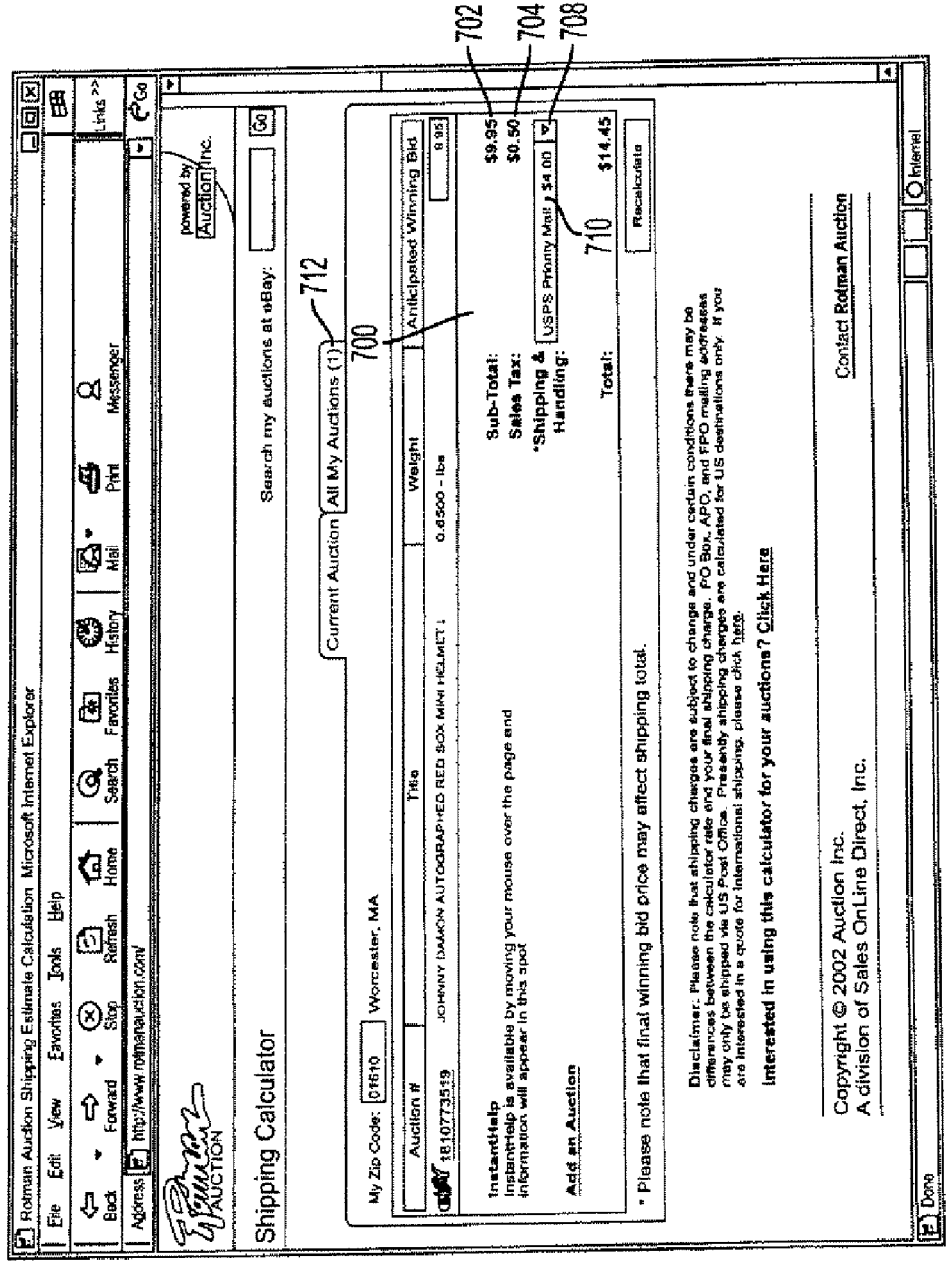
FIG. 7 is another screen display for a rate calculator for an online auction.

Referring to FIG. 7, the shipping calculator 500 returns a page with a display 700 that now contains relevant shipping information. The shipping information includes a sub-total 702, sales tax information 704, and shipping and handling cost 710. The shipping and handling cost 708 may be calculated in a manner described below. The buyer 104 may select various options from a drop down menu 708, so that the buyer 104 can choose among, for example, ground shipping versus air, or postal service versus overnight carrier service. Thus, the shipping calculator provides the buyer 104 with an accurate estimate of shipping cost, based on the location of the buyer, the cost of the item, and the manner of shipment.

Referring still to FIG. 7, the calculator 500 may feature a tab 712. By initiating the tab 712 the buyer 104 can view all of the auctions that the buyer is monitoring, or, in an embodiment, all auctions involving the same seller. Where there are multiple auctions for the same buyer 102 and seller 104, the system can track that fact and provide a consolidated shipping calculation based on the assumption that multiple items may be shipped together, rather than separately. The "all my auctions" tab 712 can, through the retrieval module 1012, capture current data for each auction and refresh the view to reflect accurate data for all current auctions.

Figure 8:
FIG. 8 is a screen display showing additional features of a rate calculator for an online auction.

Referring to FIG. 8, the shipping calculator 500 may have other features. For example, an information field 800 may provide the buyer 104 with information about the auction, such as information as to the status of the anticipated winning bid as compared to the current highest bid. Similarly, a refresh button 802 allows the buyer 104 to update the anticipated winning bid field 602 to reflect the current highest bid for the auction in question, rather than the buyer's estimate of the likely bid. Then pressing the recalculate button 804 allows the buyer 104 to obtain the cost of shipping that would apply if the current highest bid were the actual winning bid. Although these are web-enabled steps, it should be noted that the calculator 500 can be embodied as an offline, client-based application that doesn't require the round trips to a web server. Such a client application could be coded in Java, ActiveX or a similar code that is downloaded to the client. In other embodiments the system may access an application programming interface of an auction host 108, such as an API that is needed to interact with the auction. The API could require programming in any language, and could require the application to provide specific calls in order to obtain the data it requires to complete a shipping rate calculation. The system could also be employed through a virtual private network, or VPN. Thus, one of ordinary skill in the art could readily recognize various embodiments for coding the shipping calculator system 1000.

Figure 9:
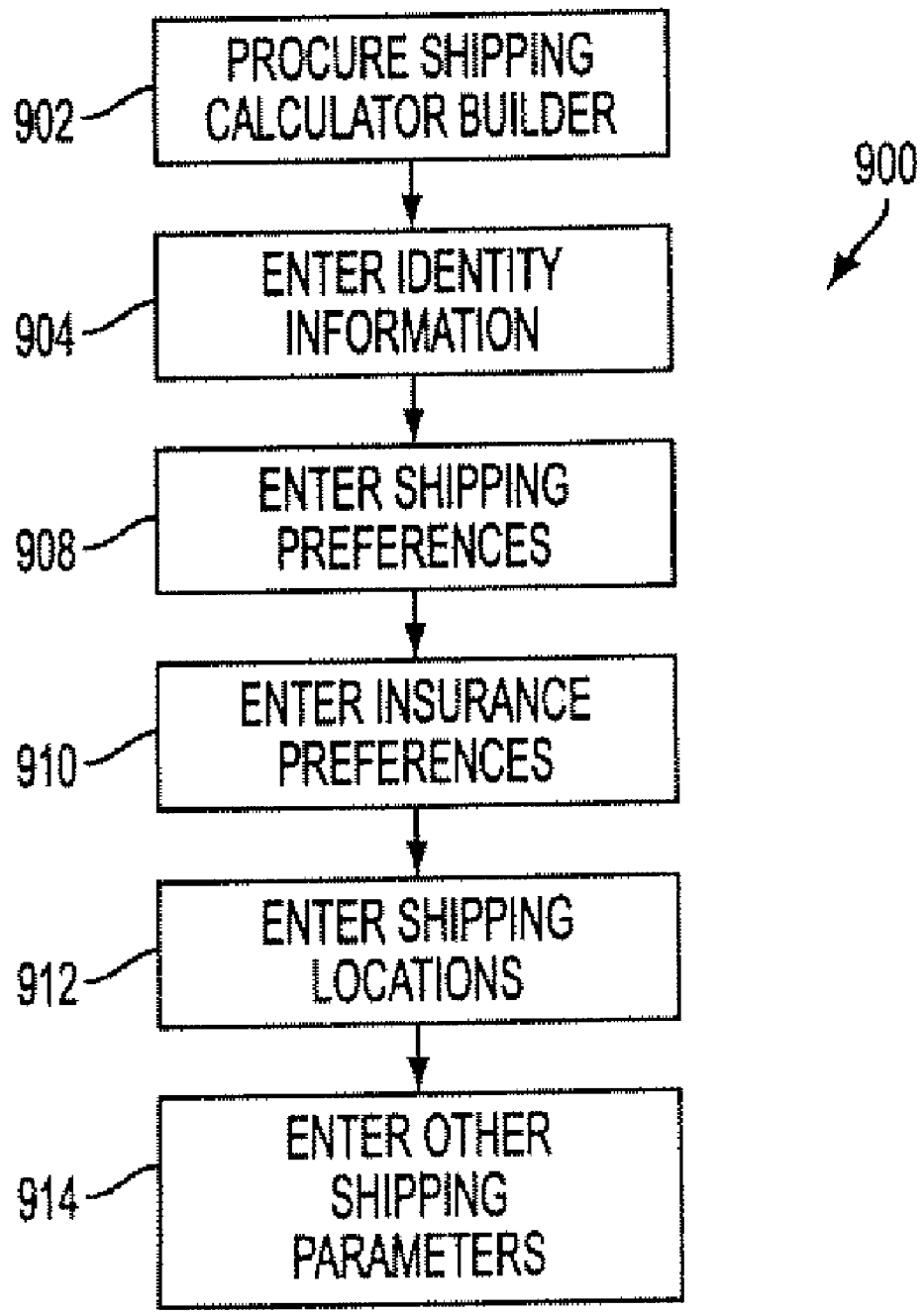
FIG. 9 is a flow diagram showing a process for a seller to initiate a shipping rate calculator for the seller's online offerings.

In order for a buyer 104 to have access to the shipping calculator 500, a seller 102 may provide the calculator 500 as part of the auction 100. Referring to FIG. 9, a flow diagram 900 depicts the steps by which a seller 102 can facilitate the provision of the calculator 500 for an auction 100. First, at a step 902 the seller 102 must acquire the capability to build the shipping calculator 500 into the seller's auctions. Thus, the seller acquires access to a shipping calculator system 1000. In embodiments, the system 1000 may include a builder application in a shipping wizard server 1014, which may be a web-based application coded in a language such as PHP, so that the seller 102 can access the system 1000 and the builder application in a shipping wizard server 1014 via the Internet or a similar computer network. Once the seller 102 has access to the shipping calculator system 1000, the seller may enter various information, such as identity and location information at a step 904, shipping preferences at a step 908, insurance preferences at a step 910, shipping locations at a step 912 and other shipping parameters (such as packaging information) at a step 914. In embodiments, all of this information is entered into fields via an online form, such as an HTML form served by a server of the shipping calculator system 1000. In other embodiments the information is entered into a downloaded client program, or the program is served through an ASP model. Details of an embodiment of the shipping calculator system 1000 are set forth below. Once all of this data is entered by the seller 102, the system 1000 can take advantage of it to generate shipping calculations for various auctions offered by the seller 102 in a manner further described below.

Figure 10:
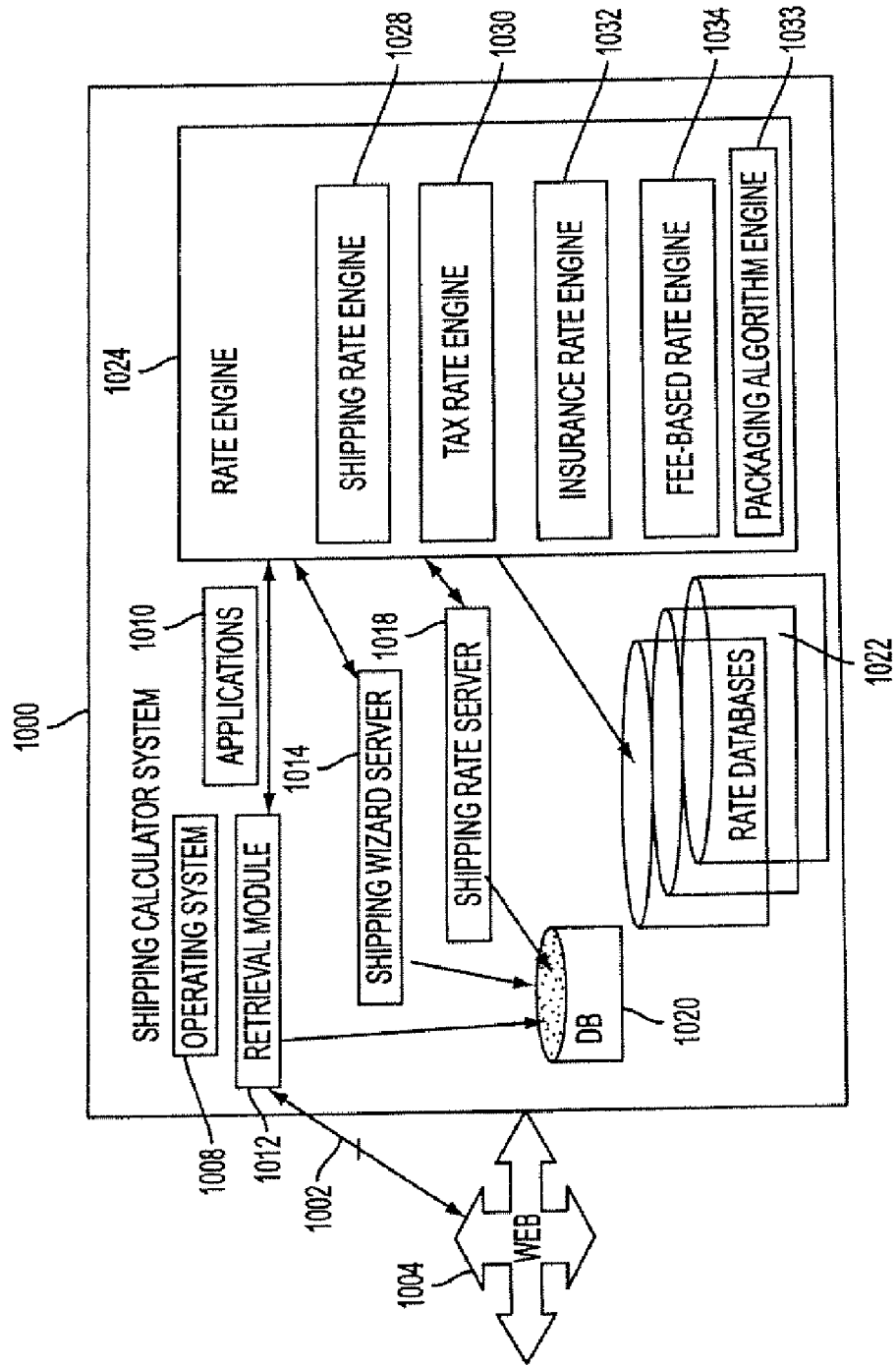
FIG. 10 is a schematic diagram showing components of a computer-based system for offering a shipping calculator for online auctions.

Referring to FIG. 10, a schematic diagram sets out high-level components for a computer-based shipping calculator system 1000. The system 1000 may be operated by a host entity for assisting various sellers in providing improved online auctions, such as by an auction host 108 or another entity. The system 1000 may include one or more modules and other elements. In particular, the system may include a communication facility 1002 for allowing it to communicate via an external communication network 1004, such as the Internet or worldwide web. The communication facility 1004 might, in some embodiments, be an application programming interface for allowing the system to interact with a third party system, such as an auction host's system, or it might be a virtual private network or other known communication facility. Thus, the communication facility 1004 may take whatever form is required for the system 1000 to retrieve data from various external sources, such as the auction, auction host, shipping carrier, postal service, or the like. Each of those external sources may have a different requirement in order to exchange data, and the communication facility 1004 may be configured in a conventional way to allow data exchange.

The system 1000 may further include various conventional computer system elements, such as an operating system 1008, one or more software applications 1010, and one or more data storage facilities 1020. The operating system 1008 may be a conventional one, such as a Unix- or Linux-based operating system, or a Windows-based operating system such as provided by Microsoft. The applications 1010 may include conventional computer software applications, such as those for data manipulation and retrieval, communications, and the like. The various other modules may be provided in software, hardware, firmware, or a combination of the same, but are in one embodiment software modules coded in a language such as PHP, or an object-oriented language such as Java or C++. The data storage facility 1020 may be a conventional database facility, such as Microsoft SQL server, and Oracle database, or an open-source data storage facility.

In addition to conventional system components, the shipping calculator system 1000 may include specialized modules or components. In particular the system 1000 may include a rate engine 1024 for calculating shipping rates based on various inputs. The rate engine 1024 may interact with other system components, including a retrieval module 1012, a shipping wizard server 1014, a shipping rate server 1018 and one or more rate databases 1022. The rate engine 1024 interacts with those other modules to obtain inputs it requires in order to make a rate calculation. The retrieval module 1012 acts through the communication facility 1004 to obtain data from an external source, such as from a web page through a spider or similar facility, or from a third party system through an application programming interface or the like. In particular, the retrieval module 1012 can obtain auction data from an auction that is identified by a buyer 104 or seller 102 during their interaction with the shipping calculator 500. For example, the retrieval module 1012 can obtain the amount of the winning bid, the current high bid, the location of the buyer 104, the number of unique visitors, the number of hits to the auction, and the like from the web site that hosts the option. This can be accomplished by extracting values from form elements in the HTML or other markup language that is used by the auction provider 108 to code the presentation of the auction.

The shipping wizard server 1014 may be a conventional server, programmed to facilitate the interaction of a user who wishes to be a seller 102 with the system 1000. The shipping wizard server 1014 can serve various pages to the seller 102, allowing the seller 102 to interact with the system through forms and similar mechanisms. The pages for the shipping wizard server 1014 can be stored for retrieval in the data storage facility 1020. The shipping wizard server 1014 thus facilitates the steps identified elsewhere herein for enabling a seller 102 to interact with the system 1000 to create an auction, to insert a shipping calculator in the auction, and to set various preferences for shipping for the seller's various auctions. The shipping wizard server 1014 can interact with the rate engine 1024 to supply it with data for making a rate calculation, in particular data about the location of the seller 102, and data about the seller's various shipping preferences and requirements.

The shipping rate server 1018 may also be a conventional server (and in fact may be part of a single integrated server with it). In this case, the shipping rate server 1018 acts to facilitate interaction of a buyer 102 with the system 1000. Thus, the shipping rate server presents pages (code for which is stored in the data storage facility 1020) to the buyer 104 that include forms for data entry, as well as those for presenting the buyer 104 with estimates of shipping costs for the auction in question. The shipping rate server 1018 can interact with the rate engine 1024 to supply it with data needed to make a shipping rate calculation, such as the buyer's location, the auction number in question, and preferences for how the item should be shipped.

The rate databases 1022 may contain shipping rate information. In embodiments, these databases may be provided for the system 1000 from third party providers, such as carriers who provide shipping. The rate databases 1022 may reside outside the system 1000 or may be imported into the system 1000, depending on what the third party provider is willing to provide. Examples include databases of shipping rates for the postal service, UPS, Federal Express, Emery, and any other shipping providers, with tables for calculating shipping costs based on weights, shipping locations, and other factors that determine the rate charged for a shipment. Interaction with these rate databases may be accomplished through a variety of APIs or other inputs. Thus, the system 1000 may require coding to allow it access to the rates in the rate databases 1022. In other embodiments the rate databases may be coded directly by the user of the system 1000, using publicly available information about shipping rates. The rate engine 1024 can access the relevant rate database 1022 to obtain a shipping rate for a given auction.

The rate engine 1024 may include various modules or engines for calculating factors that contribute to the overall shipping rate for a given auction. By way of example, the rate engine 1024 may include a shipping rate engine 1028, a tax rate engine 1030, an insurance rate engine 1032, a packaging algorithm engine 1033, and a fee-based rate engine 1034. These are by way of example, and in embodiments other factors that contribute to shipping can be handled by additional modules or engines of the rate engine 1024.

For the packaging algorithm engine 1033 a seller 102 can specify an item as prepackaged or not, and can specify for items whether they can be packaged together with other items. This data can be stored in the data storage facility 1020. A seller 102 can determine a limit to the total package, e.g., a weight limit. It is also possible for the seller 102 to provide a volume-based algorithm based on the volume of the items and the volume of the boxes or other packaging types to determine whether items can be packaged together. A seller 102 might also indicate the number of items that are to be packed together for a given type. Thus, the packaging algorithm engine 1033 allows the seller 102 to customize packing preferences for the seller's items. In embodiments, the algorithms may also provide for three-dimensional packaging calculations. The algorithms can also apply fees based on the type of box or carton that is used for packaging. For example, a hockey stick might require a box that costs a significant amount, relative to the weight of the item. An oversized item might be one that exceeds a length, a length and width, thereby increasing the cost. Therefore packaging is an important factor in shipping cost. Thus, a two-pound hockey stick is shipped as a thirty-pound item, based on "dimensional weight" calculations used by the post office and common carriers. The packaging algorithm engine 1033 determines the appropriate packaging, based on the seller's preferences and the size, weight or shape of the item, and it applies an appropriate factor to the shipping rate based on the size and weight of the packaging.

The fee-based rate engine 1034 calculates rates based on seller inputs, such as rates charged for shipping and handling above the rates from the common carriers. In an embodiment a seller 102 may wish to charge a flat rate for shipping, or a flat rate per item shipped. The fee-based rate engine 1034 can access the seller's preferences, which are stored in the data storage facility 1020 and apply the appropriate flat rate or other fee-based rate for the shipment. For example, if the packaging algorithm engine 1033 determines that three items will be shipped together, and the seller 102 has indicated that it will charge a flat rate for a first item, and a different flat rate for each additional item, then the fee-based rate engine 1034 can calculate and retrieve the appropriate flat rate for shipping three items from that seller by adding the rate for the first item to two times the rate for each additional item.

In other embodiments, rather than charging a flat fee or a fee set in advance by the seller 102, the system 1000 may need to calculate a rate based on other factors, such as rates charged by common carriers, weights, package sizes, distances, and the like. The shipping rate engine 1028 can calculate a rate for a shipment, based on inputs such as the distance between the seller location and the buyer location, the weight of the item, the weight of any packaging, and the method of shipment. These various inputs can be obtained from the retrieval module 1012, the servers, other modules and the rate databases 1022. The shipping rate engine 1028 thus calculates a basic shipping rate for the item, once all of the inputs are placed in it.

The tax rate engine 1030 determines what taxes may apply to the auction, based on inputs from the retrieval module and the shipping wizard server. In an embodiment, the shipping calculator 500 may be part of an overall auction management system that stores information for a buyer. In such an embodiment, the system can store a tax exemption certificate for a buyer and determine not to charge the buyer tax on a transaction that would otherwise be taxable.

The insurance rate engine 1032 calculates a cost of insurance to be added to the overall shipping rate, based on the preferences of the buyer and seller as expressed in their completion of forms served by the servers, as well as insurance rates stored in the rate databases 1022.

The rate engine 1024 can integrate the inputs from the calculations of the other modules and engines (applying whatever discounts or other factors are required if components are not simply added), to obtain a shipping rate based on the various inputs. The rate may be a flat rate from the fee-based engine 1034, a rate calculated from the other engines, or a rate from a combination of the different types of calculation.

The system 1000 may be provided by a host for access by various entities, such as sellers 102, buyers 104 and auction hosts 108. Alternatively, it might be licensed to and provided directly by an auction host 108. In other embodiments it might be accessed by one or more entities in an ASP business model. Such embodiments may be accomplished using appropriate facilities for coding such models, including XML, WDDX, Java RMI, or the like.

Figure 11:
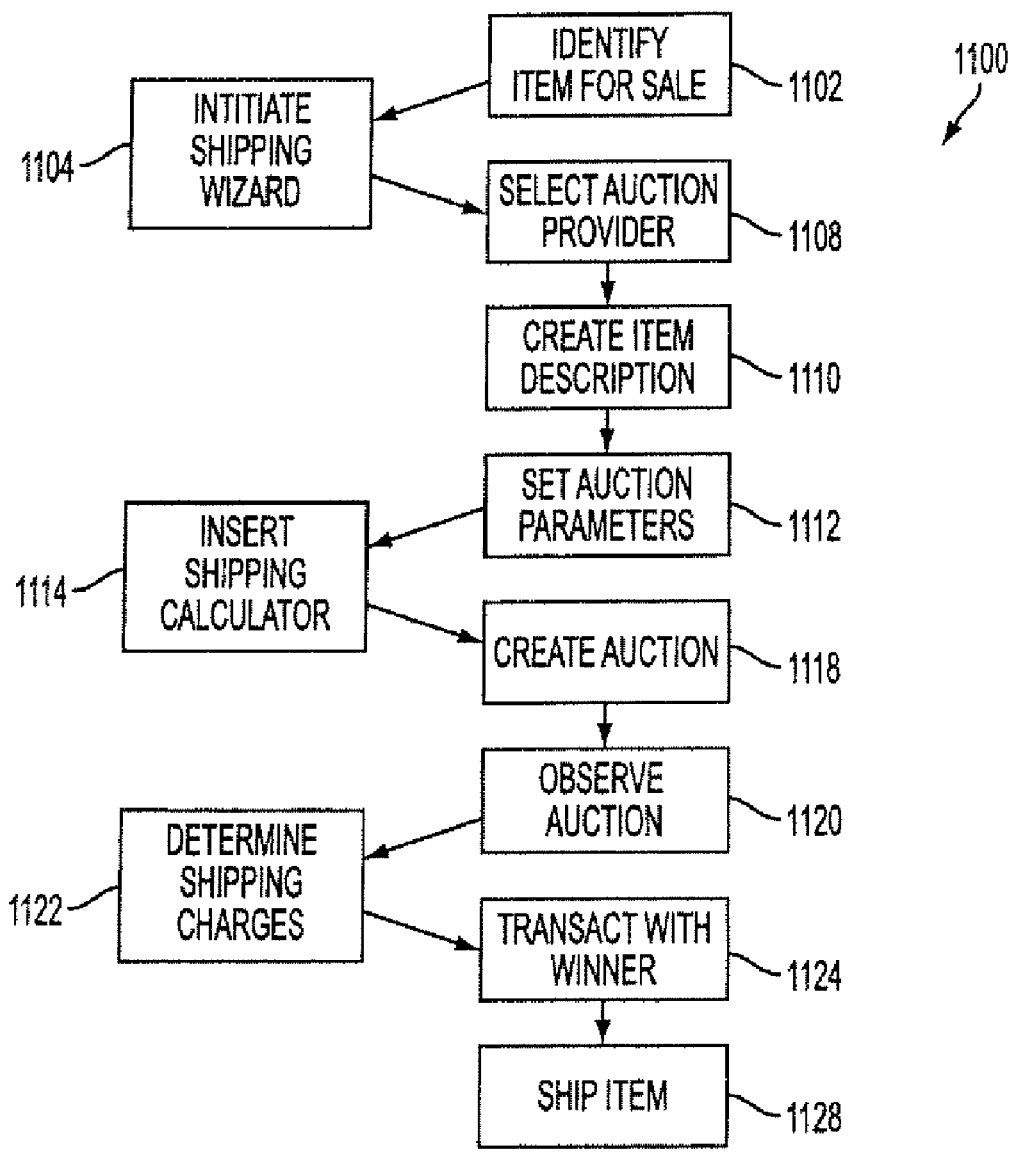
FIG. 11 is a flow diagram showing process steps for adding a shipping calculator to an online auction.

Referring to FIG. 11, a flow diagram 1100 depicts steps by which a seller 102 can take advantage of the system 1000 to offer a shipping calculator in the seller's auctions. First, at a step 1102, the seller 102 identifies an item to be auctioned, just as in a conventional auction. Next, at a step 1104, the seller 102 initiates interaction with the system 1000, such as by initiating a shipping calculator wizard served by the shipping wizard server 1014. The shipping wizard prompts the seller 102 to enter various information needed to determine shipping costs, such as the seller's preferences for providers, packaging preferences and weights, taxability of transactions, insurance preferences, modes of shipment, and the like. Many of these items may be stored in default and need not be reentered for every new transaction. Once the seller has completed the wizard, the seller 102 can select an auction provider at a step 1108, create an item description at a step 1110, and set auction parameters at a step 1112, in each case in a manner similar to for a conventional auction. The seller can 102 can immediately look at a test auction at the point the seller has completed the wizard, which can pop up a view of the auction in a separate window. Based on the values entered in the wizard, the seller can also click on a shipping inspector, which provides a detailed breakout view of the specific values used to determine the shipping cost.

Next, at a step 1114, the seller 102 can insert the shipping calculator code into the auction. In an embodiment this is accomplished by having the seller insert code for the shipping calculator into the HTML for the auction document. Once inserted into the HTML for the auction, the calculator 500 will automatically contact the system 1000 when initiated by a buyer 104. The seller can then create an auction at a step 1118 and observe the results at a step 1120, just as for a conventional auction. When the auction is complete, the system 1000 can determine the winner (such as via the retrieval module 1012 and make the appropriate calculation to inform the seller 102 and buyer 104 of the cost of shipping, based on the winning bid, the locations of the seller 102 (which may include multiple drop-ship locations of third parties, for example) and buyer 104 (e.g., items going to one or more locations), the weight of the items, packaging factors, taxes, and the like. At a step 1128, the seller 102 and buyer 104 may complete the transaction, and the seller 102 can ship the item in the manner identified by the buyer 104. In an embodiment this may be accomplished without the need for the buyer 104 to enter further information, since all information can be retrieved from the auction itself or from the buyer's previous interactions with the rate calculator 500.

Figure 12:
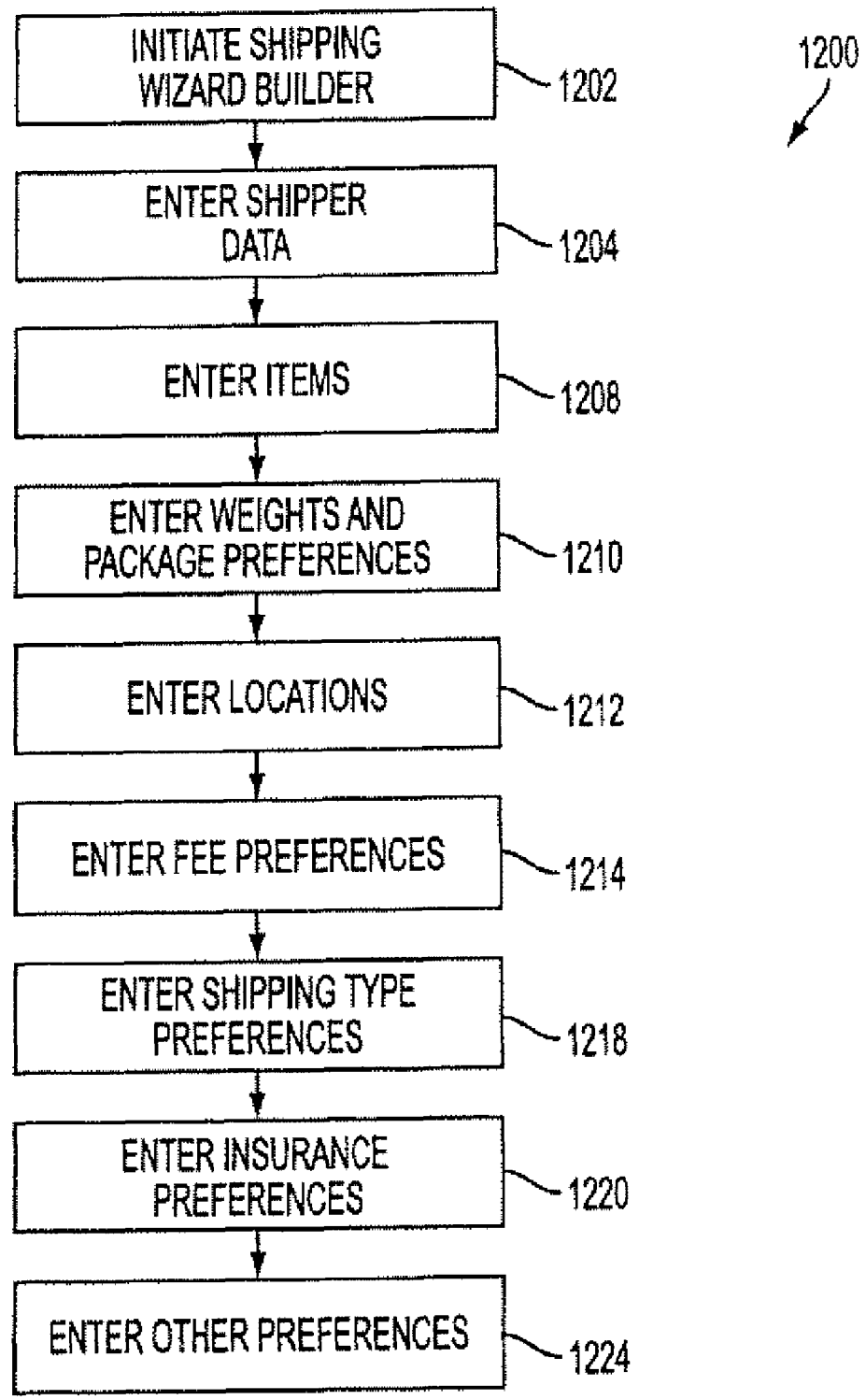
FIG. 12 is a flow diagram showing a process for a seller to enter default shipping preferences that can be used by a shipping calculator for an online auction.

Referring to FIG. 12, a flow diagram 1200 includes steps by which a seller 102 may enter preferences as to shipping in interaction with the shipping rate wizard server 1014. The seller 102 initiates the shipping wizard at a step 1202. Next, at a step 1204 the seller 102 enters shipper data, such as the name and shipping locations for that seller 102. Next, the seller 102 can enter items the seller may ship at a step 1208. Next, at a step 1210 the seller 102 can enter item weights and packaging preferences (including package weights in some cases) for items the seller 102 will auction. The steps 1208 and 1210 may be optional at this point. That is, the system 1000 can automatically update the system with new items and weights at the time they are listed, rather than in advance. Next, at a step 1212 the seller 102 can enter locations from which shipments can be made. Next, at a step 1214 the seller 102 can enter any fee preferences, such as a desire to apply a handling fee to all shipments and the amount. Next, at a step 1218 the seller 102 can enter shipping type preferences, such as a preference for next day air shipment, ground shipment, postal service, or the like. Next, at a step 1220 the seller can enter insurance preferences. Next, at a step 1224 the seller 102 can enter other preferences, including any custom preferences the system 1000 wishes to allow. Through completion of these steps the seller 102 establishes a set of default preferences that can be retrieved for a given auction for the seller during setup and later upon completion of the auction. Many other options and properties can be included in the wizard calculator, such as quantities of items, and other shipping option parameters.

In an embodiment, a buyer can register at the site and receive preferred shipping rates. Based on the buyer's address, it can be verified through a verification process, in interaction with a database of known addresses through an API provided, for example, by the postal service. It is more expensive to ship to a residential address with many carriers. So, the calculator 500 can generally assume a residential rate. With address verification, it is possible to quote commercial rates where appropriate. The seller doesn't know who the buyer is, but the buyer can still receive the best available rate.

In an embodiment, if a buyer registers with the host, they do not need to reregister when they win an auction. The information is sent to the seller automatically by the system.

Figure 13:
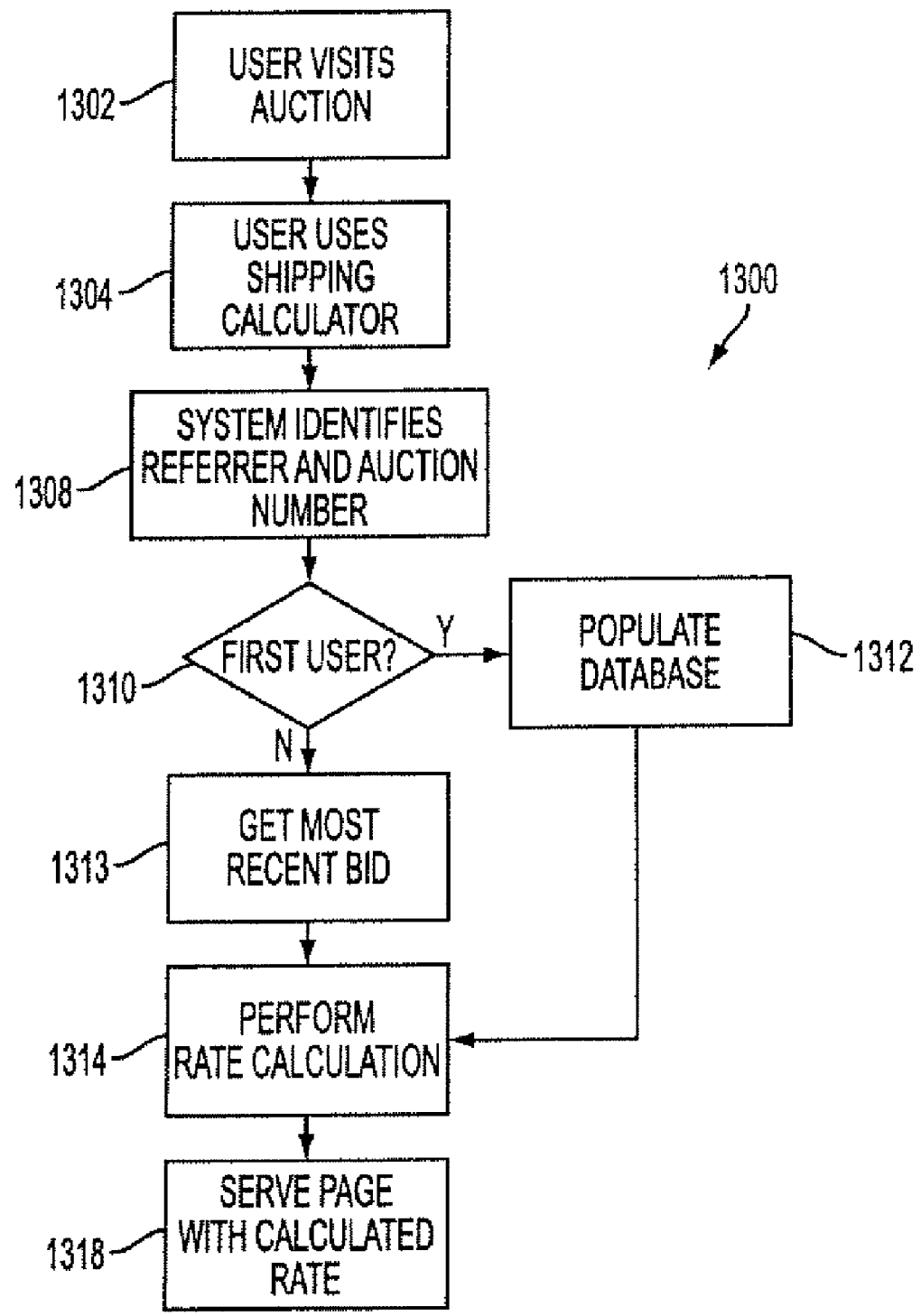
FIG. 13 is a flow diagram showing a process for a system to handle a buyer's interaction with a shipping calculator in an online auction.

Referring to FIG. 13, a flow diagram 1300 depicts steps by which the system 1000 facilitates a buyer's interaction with an auction 100 that has been established with the shipping calculator 500. First, at a step 1302 the buyer 104 can visit the auction 100, such as by visiting the web site of an auction provider 108. Next, at a step 1304 the buyer 104 can use the shipping calculator 500 by entering a zip code or other location code or information and clicking the submit button on the page. Next, at a step 1308 the system 1000 identifies which auction host 108 has referred the auction, as determined by tracking the URL at which the buyer 104 resided before the buyer 104 was referred to the system 1000 (a tracking feature common to most conventional browsers). Where the tracking feature does not provide the identity of the auction provider 108 the buyer 104 is prompted to enter an auction number, so that the system 1000 can retrieve data from the appropriate auction. Once the system has identified the auction host 108 and auction 100, the system 1000 checks at a step 1310 whether this is the first buyer 104 to use the calculator 500 for this particular auction. If so, then at a step 1312 the system 1000 populates the data storage facility 1020 with data for this auction, including the item, its weight, the current highest bid, and the like. The data can be retrieved later for further shipping rate calculations for this auction, such as if another buyer 104 uses the calculator for that auction. If at the step 1310 the user is not the first user, then the system goes directly to a step 1313, where the system gets the current highest bid, then a step 1314, where the system 1000 calculates the shipping rate (or hypothetical shipping rate if the auction is not over), based on the data for the auction (including the current bid), the data entered by the seller, and the location and shipping preferences of the buyer 104. Then at a step 1318 the system 1000 serves a page to the buyer 104 with an indication of the shipping rate.

Figure 14:
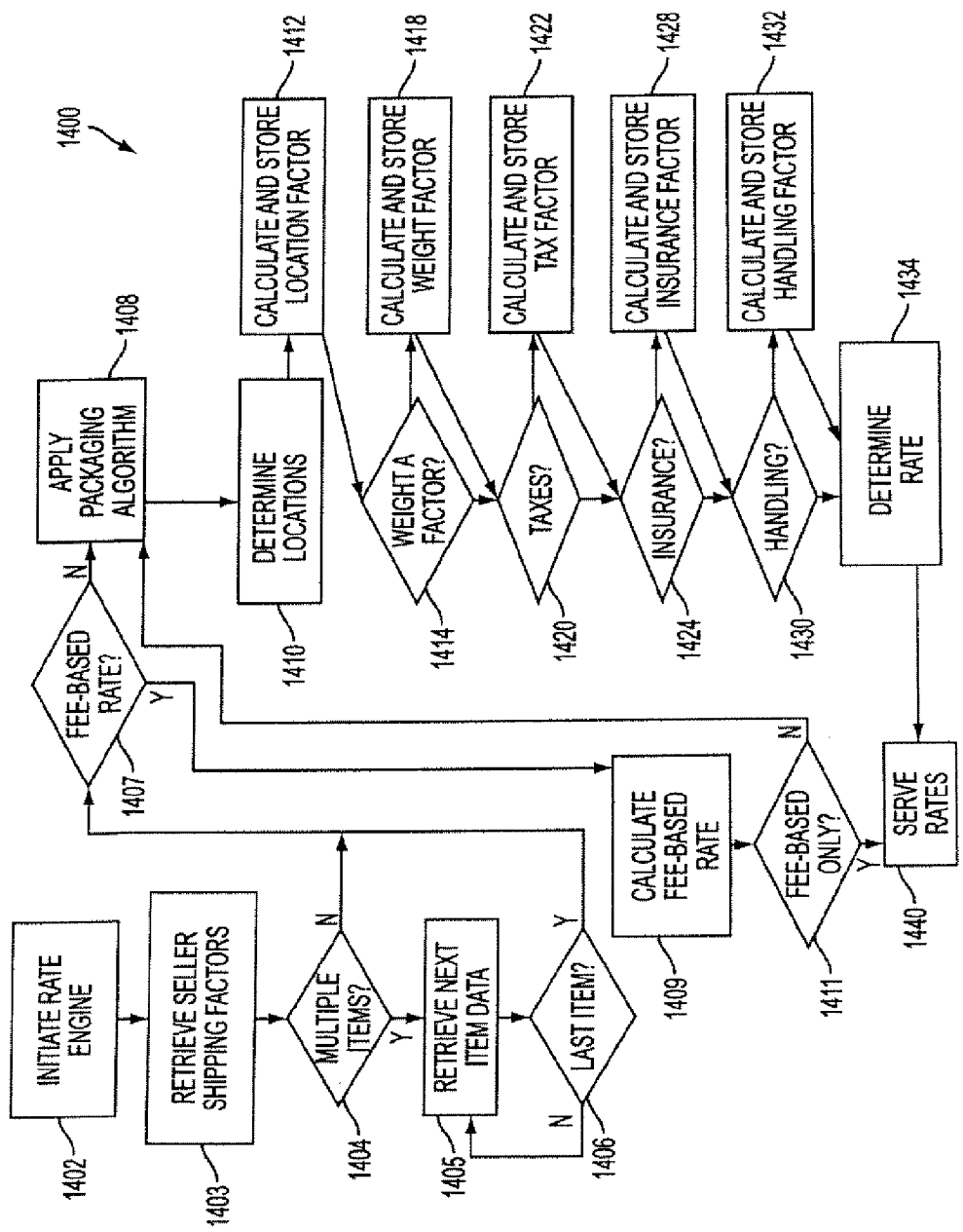
FIG. 14 is a flow diagram showing a server process for generating shipping rates for an online auction.

Referring to FIG. 14, a flow diagram 1400 sets out steps by which the system 1000 can determine a shipping rate. At a step 1402 the system 1000 initiates the rate engine, such as in response to a buyer 104 clicking on the calculator 500. Next, at a step 1403, the system 1000 retrieves the seller's shipping preferences from the data storage facility 1020.

In embodiments, the system can recognize when a given buyer has purchased multiple items from a given seller 102, and it can prompt the seller 102 to combine the items into a single shipment. The system 1000 can then apply the rate calculation to the combined shipment, rather than making separate calculations for all shipments. Thus, at a step 1404, the system determines whether there are multiple items to be shipped from the seller 102 to this buyer 104. This may be accomplished by retrieving the data that the buyer 104 views when clicking the "all my auctions" tab 712. If there are multiple items at the step 1404, then at a step 1405 the system retrieves data for the first item's auction, either previously stored in the data storage facility 1020 (if a buyer 104 has used the calculator for this auction before) or by accessing the data in the auction directly, such as by a spider or APT. At a step 1406 the system determines whether the item for which the data was retrieved at the step 1405 is the last item. If not, then the system returns to the step 1405 repeatedly until data for all items has been retrieved for use by the system. If at the step 1404 it is determined that there is only one item, or if at the step 1406 it is determined that the item is the last item, then processing proceeds to a step 1407.

At the step 1407 the system queries the seller's preferences to determine whether the shipping rate is a fee-based rate. If so, then at a step 1409 the system applies the fee-based rate, whether based on a single item shipping charge or a multiple item shipping charge. Next, at a step 1411 the system applies the preferences of the seller to determine whether the rate is solely fee-based, or whether other factors apply. If at the step 1411 no other factors apply, then the system can serve a rate for the rate calculator 500 at a step 1440.

If at the step 1411 it is determined that other factors apply, or if at the step 1407 it is determined that the rate is not a fee-based rate, then processing proceeds to a step 1408 where the packaging algorithm is applied by the packaging algorithm engine 1033. The packaging algorithm engine at the step 1408 determines the packaging for the item or items that are to be shipped from the seller 102 to the buyer 104. Packaging may be standard for the seller's items, may be pre-specified, or may be determined by calculations based on the size or weight of the items, or in special cases, the shape (such as a hockey stick that requires a special box). Once packaging has been determined, the system can proceed to calculate a shipping rate based on various factors.

At a step 1410 the system can then determine the locations of the seller 102 and the buyer 104 based on data entered in interaction with the servers of the system 1000. At the step 1412 the system 1000 can also calculate and store a rate factor based on the locations of the buyer 104 and seller 102. Next, the system can query at a step 1414 whether weight is a factor in the calculation. If so, then the system can at a step 1418 calculate and store a weight factor for the item (optionally including package weight for packaged items). Next, at a step 1420 the system can query whether taxes apply and at a step 1422 calculate and store a tax factor. Next, at a step 1424 the system can query whether insurance charges apply. If so, then the system 1000 can calculate and store an insurance factor for the item at a step 1428. Next, the system 1000 queries whether there is a handling charge by the seller 102 at a step 1430. The system 1000 can then calculate and store a handling factor at a step 1432.

Once all of the factors are determined, then the system can calculate a rate at a step 1434. The calculation may be a simple addition, or it may combine factors according to any algorithm used to determine cost of shipping. (For example, shipping may be "free" if the buyer is within a given distance of the seller, if the order is over $100, or if the order is within a time frame.) The system 1000 can recognize and apply this to the overall rate based on the location factor at the step 1412.

Finally, at a step 1440, the system 1000 can serve a rate via the rate calculator 500.

In embodiments the system 1000 can track where buyers are coming from to determine where the greatest interest is for a given auction item. Thus, the host can surmise demographic information.

Figure 15:
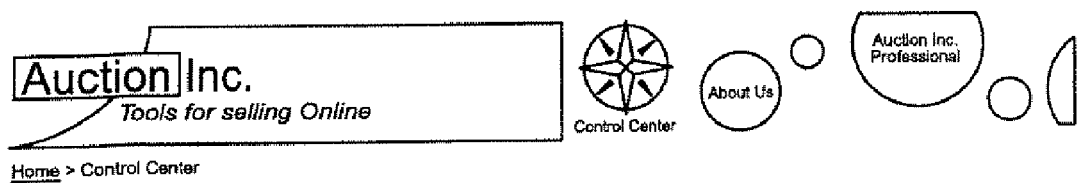
FIG. 15 is a screen display for a seller to manage an online auction with a shipping calculator feature.

Referring to FIG. 15, an illustration is provided of a screen 1500 for a seller 102 who wishes to use the system 1000. The seller 102 can administer his or her interaction with the system 1000 through the screen 1500. The seller can access instructions 1502 for listing an auction. The seller can also monitor auction and sales activity for the seller's auctions through a link 1504. The seller 102 can also access a wizard 1508 for inserting the shipping calculator 500 into the auction. The seller 102 can also set up shipping preferences through the link 1510 or can access the shipping calculator 1512.

Referring to FIG. 16 an illustration is provided of a screen 1600 that may be provided if the seller asks for listing instructions at the link 1502 of FIG. 15. The listing instructions indicate steps for including a shipping calculator 500 in an auction of an auction provider, including steps of including HTML generated by a wizard into the item description for an auction 1602, making sure that shipping sections for an item reference the item description 1604, checking for accuracy 1608, and testing the calculator before placing the HTML in the auction listing 1610. As indicated on the screen 1600, the listing mechanisms are not limited to a particular auction provider 108, but rather can be used with any auction provider, still providing appropriate rate calculations. The seller can also reference the shipping inspector to confirm that the underlying items in the rate calculation are correct.

Referring to FIG. 17, a screen is illustrated as an example of a wizard 1700 that could be initiated by clicking on the wizard link 1508 of FIG. 15. The wizard 1700 provides a form by which the seller 102 can enter data into fields needed to facilitate generation of code for inclusion in an auction listing. The wizard 1700 includes a drop down menu 1702 through which the seller 102 can select a particular format for how the calculator 500 will appear on the screen. The wizard also includes a field 1704 for entering a flat shipping rate for a first item and a field 1708 for entering a flat shipping rate for each additional item. These rates can be triggered if the seller 102 enters a check mark in a box 1710 that indicates the seller 102 wishes to charge a flat shipping rate. If the seller 102 does not wish to charge a flat shipping rate, then the seller 102 can enter data in other fields to calculate a shipping rate. Through a drop down menu 1712 the seller can indicate whether to package items together if a buyer wins more than one of the seller's auctions. The seller 102 can also enter the weight of the item into a weight field 1714 and the dimensions of the item into a length field 1718, width field 1720 and height field 1722. The seller can also indicate whether the item is taxable in a tax field 1724 an whether to include insurance in an insurance field 1728. Then the seller can generate HTML for inclusion into the auction listing by clicking a generate HTML button 1730, which prompts the shipping wizard server of the system 1000 to build and serve the HTML for the listing to the seller 102. The seller 102 can then paste HTML into the item description of the auction, which will in turn include the rate calculator 500 in that auction, with the rates being calculated based on the preference the seller 102 entered in the wizard 1700.

In embodiments there are other shipping options. For example, the post office has a media rate for bound printed matter. You may specify that such a rate is required. Some items might require special handling, such as if not in a carton. The rate calculator can account for these factors as well.

The items entered into the wizard 1700 depicted in FIG. 17 need not be entered again for every auction of the seller 102. In embodiments, the seller can configure shipping options by setting default values for each of the fields in a form that is stored for the seller 102 in the data storage facility 1020. In that case the wizard 1700 only needs to prompt the seller to enter values for which the seller 102 does not wish to vary the default values. Any of the fields of FIG. 17 can be stored as default values for the seller 102. In addition, other values can be stored, such as shipping methods. Referring to FIG. 18, a screen 1800 shows fields for a seller 102 to set default values for various shipping methods. The seller 102 can indicate that it wishes to activate a shipping method by clicking one of the activate buttons 1802. The seller can then enter a handling charge for each type of shipping in each of the handling charge fields 1804. The system 100C stores these values, so that when a buyer 104 clicks on the shipping calculator in the seller's auction of an item, the handling charge is added to the rate calculated by the rate calculator 500 for that item, based on the type of shipping selected by the buyer 104.

Figure 19:
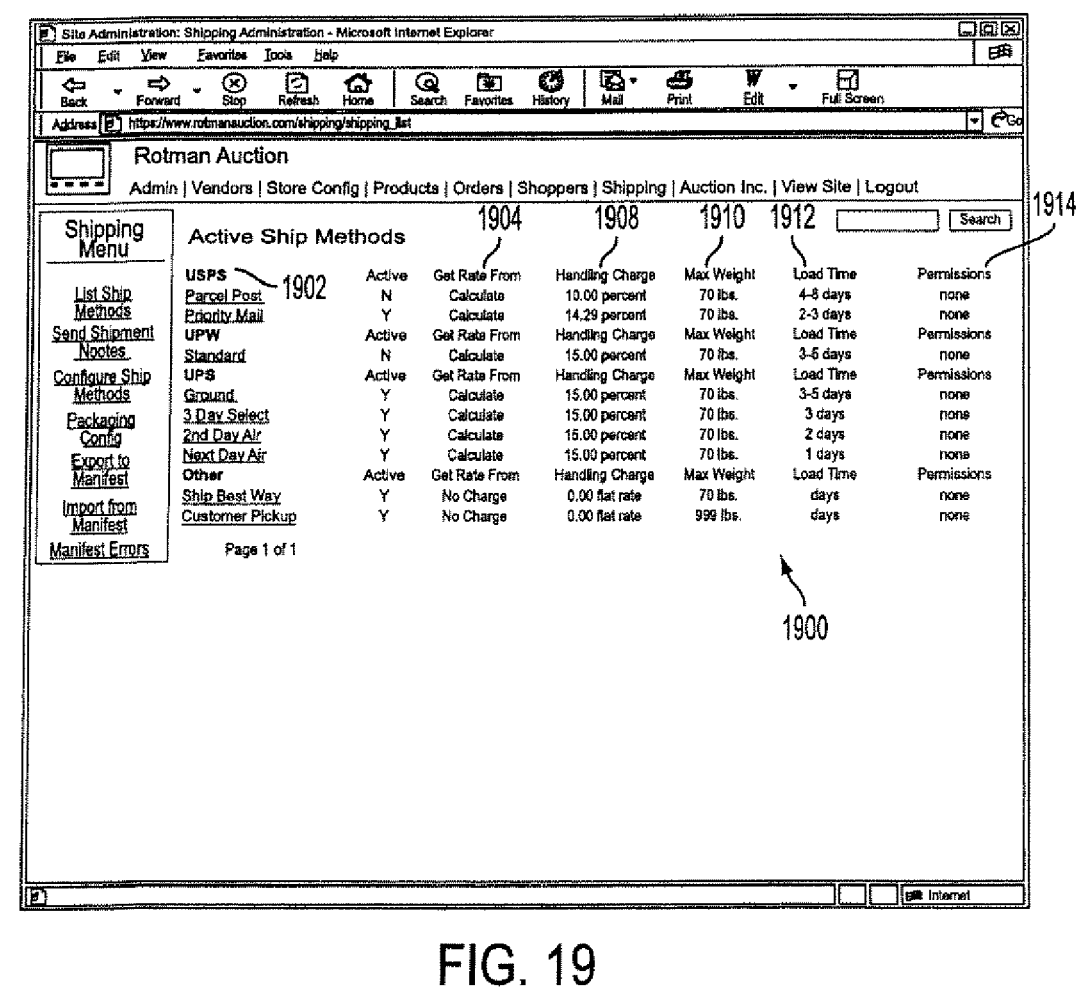

FIG. 19 depicts a status screen 1900 by which a seller 102 can review the status of various default values entered for shipping methods, including active methods 1902, how the rate is to be calculated 1904, handling charges that apply 1908, weights allowed 1910, lead time to be allowed 1912, and required permissions 1914.

Referring to FIG. 20, a screen 2000 shows that a seller 102 can configure the system to calculate packaging weight based on the weight of the item to be packaged.

Referring to FIG. 21, a screen 2100 shows that tax rates can be stored for purposes of determining taxes that apply to the auction. The system 1000 can recognize the difference between interstate and intrastate shipments an adjust taxes accordingly.

Thus, the system 1000 allows a seller 102 to register, set up preferences, and generate HTML code that will be embedded into an auction listing page. The buyer then enters a zip code into a calculator that is created through the HTML, and the system 1000 calculates a shipping rate based on the seller data, buyer data, and auction data. At the time the auction is created the system 1000 does not require storage of any data other than the shipping preferences of the seller 102.

Storage of seller preferences has a number of advantages. Conventional systems require a seller to reenter shipping data each time an auction is created, resulting in a great deal of extra labor. With the wizard described herein the system analyzes seller preferences and only requires the seller to enter a limited set of data, unless the seller wishes to vary default preferences.

Each time a seller 102 wishes to run an auction, the seller only needs to pull up the wizard and generate HTML for inclusion in the auction listing of the item the seller wishes to sell. When a buyer 104 uses the calculator information is transmitted from the buyer's browser to the system 1000. The system 1000 can take the information and through the retrieval module 1012 return to the site that hosts the auction, inspect the auction, retrieve what information is needed from the HTML of the auction, and construct all of the data needed to make a rate calculation. Use of the retrieval module 1012 allows the system 1000 to be used with any listing tool. Thus, the system 1000 is platform independent, working with any web-based auction provider. The system 1000 only needs to be programmed to recognize the appropriate form fields in the forms for the auction. For example, the system may look for a value in the "shipcalc" field in the HTML form for an eBay auction, or a different value in a different field for another auction. The system retrieves all values in the relevant fields and returns them to server as a basis for a rate calculation.

To identify the auction from which the buyer 104 is using the calculator, the system identifies a URL sent by the browser when the buyer 104 hits the calculate button. The referrer URL is sent as a feature of Netscape, Explorer, and other conventional browsers. In some browsers the referrer URL is disabled or not provided, in which case the user is prompted for an auction number and provider, which allows the system 1000 to retrieve the data it needs.

When a buyer 104 arrives (via the "calculate" button) at the host system 1000, the system gets the item or auction number from the page at which the buyer 104 was before arriving. The system then inspects the data storage facility 1020 to see whether it has inspected that auction before. If so, it uses the stored data. If not, then it gathers the information from the page and stores it.

Once the system 1000 has the information for the auction, it can place a persistent cookie on the buyer's machine, allowing the system 1000 to recognize the buyer 104 upon return to the system 1000. The cookie can allow the system to track values (such as the current high bid or winning bid) that occur in the auction and update the buyer's calculator to reflect the changes. Thus the system can automatically update a buyer's view of an auction (and the shipping calculation) to reflect the current status of the auction.

The system also allows a seller to edit mistakes. The seller can go to the system and edit an auction to correct errors, such as item weights and the like. As the buyer enters the auction the buyer can get a message saying the seller needs to review the auction before shipping quotes are finalized.

In an embodiment the system can access a database of addresses to determine whether a given address is a commercial or residential address. Thus, the system can apply commercial or non-commercial rates as appropriate for the type of shipment, based on the address of the recipient. This can be accomplished using an API provided by the postal service.

In embodiments the seller can allow drop shipment from multiple locations, with the calculator determining the best location for a shipment, given the location of the buyer.

In embodiments, the shipping calculator 500 may be part of a larger system that offers auction management capabilities, such as tracking status, email notification of auction results, automated fulfillment of shipping, and automated notification to the parties of tracking information for shipments. For example, after an auction 100 is completed, a buyer 104 can check out and can be integrated with any payment provider (e.g., Paypal). Thus, the shipping calculator 500 can be part of an integrated commerce system. After winning, the buyer can come to the system 1000 and through a checkout process that uses the shipping calculator 500 to determine the shipping charges that will apply for the transaction.

All patents, patent applications, and other documents referenced herein are hereby incorporated by reference. While the disclosure has been described in connection with certain preferred embodiments, other embodiments would be readily understood by those of ordinary skill in the art and are intended to be encompassed herein.

The invention claimed is:

1. A method comprising:
 receiving, at a server computer, first data from a remote seller computer over a network, wherein the first data comprises:
 location information for the remote seller; and one or more shipping preferences of the remote seller, wherein the shipping preferences comprise any one of, or some combination of:
(i) a flat fee,
(ii) a fee set by the seller,
(iii) one or more rates charged by one or more common carriers,
(iv) a distance between the seller location and the buyer location,
(v) size of the item,
(vi) weight of the item,
(vii) free shipping, and
(viii) one or more dimensions of the item;
storing the first data in a database;
receiving, at the server computer, second data from a remote buyer computer over a network, wherein the second data corresponds to location information for the remote buyer;
storing the second data in a database;
receiving, at the server computer, third data from the remote seller computer over a network, wherein the third data corresponds to a price of an item that is offered for sale on an online auction website;
storing the third data in a database;
determining, for the remote buyer, a shipping rate for the item, wherein the step of determining the shipping rate comprises:
retrieving, from the database, the first data corresponding to the one or more shipping preferences of the remote seller;
retrieving, from the database, the second data corresponding to the location information for the remote buyer;
determining an applicable tax factor for the item that is offered for sale on the online auction website based, at least in part, on the location information for the remote buyer, by:
identifying, from the second data corresponding to location information of the remote buyer, a state associated with the buyer; and
determining a tax rate corresponding to the state associated with the remote buyer for the purchase of the item;
calculating the shipping rate of the item based at least in part on the one or more shipping preferences of the remote seller; and
providing to the remote buyer computer over the network the shipping rate of the item that is offered for sale on the online auction website.

2. The method of claim 1, wherein the tax factor is zero.

3. The method of claim 2, wherein the database that stores the first data, the second data and the third data is not disposed at the same location as the remote seller.

4. The method of claim 1, wherein the third data received from the remote seller computer over the network corresponds to the minimum price the seller will accept for the item that is offered for sale on the online auction website.

5. The method of claim 1, wherein the step of determining the applicable tax factor for the item comprises recognizing whether the item is to be shipped intrastate or interstate.

6. The method of claim 1, wherein the step of determining the applicable tax factor for the item is offered for sale on the online auction website further comprising the step of applying the tax rate to the price of the item, and wherein the price of the item that the tax rate is applied to is any one of:
a. a winning bid of the buyer; or
b. a minimum price the seller will accept for the item; or
c. the price of the item corresponding to the third data received from the remote seller computer.

7. The method of claim 1, wherein the database that stores the first data and the second data is not disposed at the same location as the remote seller.

8. The method of claim 1, further comprising the step of: calculating the shipping rate of the item based at least in part on the tax factor, if the tax factor is not zero.

9. The method of claim 1, further comprising the steps of: determining applicability of insurance for the item purchased; and
if insurance is determined applicable, determining a cost of the insurance for the item purchased, the cost of insurance based at least in part on one or more of:
a. seller shipping preferences;
b. buyer shipping preferences; and
c. a combination of seller shipping preferences and buyer shipping preferences.

10. The method of claim 1, further comprising the step of: determining one or more packaging preferences for the item.

11. The method of claim 1, where a plurality of sellers participate in the online auction website.

12. The method of claim 11, where the location information for at least two of the plurality of sellers is associated with a different state.

13. A system comprising:
a computer interface configured to enable a remote seller to offer an item for sale in an online auction;
a database configured to store first data comprising:
location information for the remote seller; and
one or more shipping preferences of the remote seller, wherein the shipping preferences comprise any one of, or some combination of:
(i) a flat fee,
(ii) a fee set by the seller,
(iii) one or more rates charged by one or more common carriers,
(iv) a distance between the seller location and the buyer location,
(v) size of the item,
(vi) weight of the item,
(vii) free shipping, and
(viii) one or more dimensions of the item;
a database configured to store second data corresponding to location information for a remote buyer;
a database configured to store third data corresponding to a price of the item;
a rate engine configured to:
determine, for the remote buyer, a shipping rate for the item by performing the steps of:
retrieve, from the database, the first data corresponding to the one or more shipping preferences of the remote seller;
retrieve, from the database, the second data corresponding to the location information for the remote buyer;
determine an applicable tax factor for the item that is offered for sale on the online auction website based, at least in part, on the location information for the remote buyer, by:
identifying, from the second data corresponding to location information of the remote buyer, a state associated with the buyer; and
determining a tax rate corresponding to the state associated with the remote buyer for the purchase of the item;
calculate the shipping rate of the item based at least in part on the one or more shipping preferences of the remote seller; and provide the shipping rate to the remote buyer computer over the network.

14. The system of claim 13, wherein the tax factor is zero.

15. The system of claim 14, wherein the database that stores the first data, the second data and the third data is not disposed at the same location as the remote seller.

16. The system of claim 13, wherein the third data received from the remote seller computer over the network corresponds to the minimum price the seller will accept for the item that is offered for sale on the online auction website.

17. The system of claim 13, wherein the rate engine is further configured to recognize whether the item is to be shipped intrastate or interstate.

18. The system of claim 13, wherein the rate engine is further configured to determine the applicable tax factor for the item that is offered for sale on the online auction website by applying the tax rate to the price of the item, and wherein the price of the item that the tax rate is applied to is any one of:
  a. a winning bid of the buyer; or
  b. a minimum price the seller will accept for the item; or
  c. the price of the item corresponding to the third data received from the remote seller computer.

19. The system of claim 13, wherein the database that stores the first data and the second data is not disposed at the same location as the remote seller.

20. The system of claim 13, wherein the rate engine is further configured to calculate the shipping rate of the item based at least in part on the tax factor, if tax is determined applicable.

21. The system of claim 13, wherein the rate engine is further configured to:
  determine applicability of insurance for the item purchased; and
  if insurance is determined applicable, determine a cost of the insurance for the item purchased, the cost of insurance based at least in part on one or more of:
    a. seller shipping preferences;
    b. buyer shipping preferences; and
    c. a combination of seller shipping preferences and buyer shipping preferences.

22. The system of claim 3, wherein the rate engine is further configured to:
  determine one or more packaging preferences for the item.

23. The system of claim 13, where a plurality of sellers participate in the online auction website.

24. The system of claim 23, where the location information for at least two of the plurality of sellers is associated with a different state.

* * * * *